(No Model.)
J. D. LAWRENCE.
CAR MOVER.
No. 255,639. Patented Mar. 28, 1882.
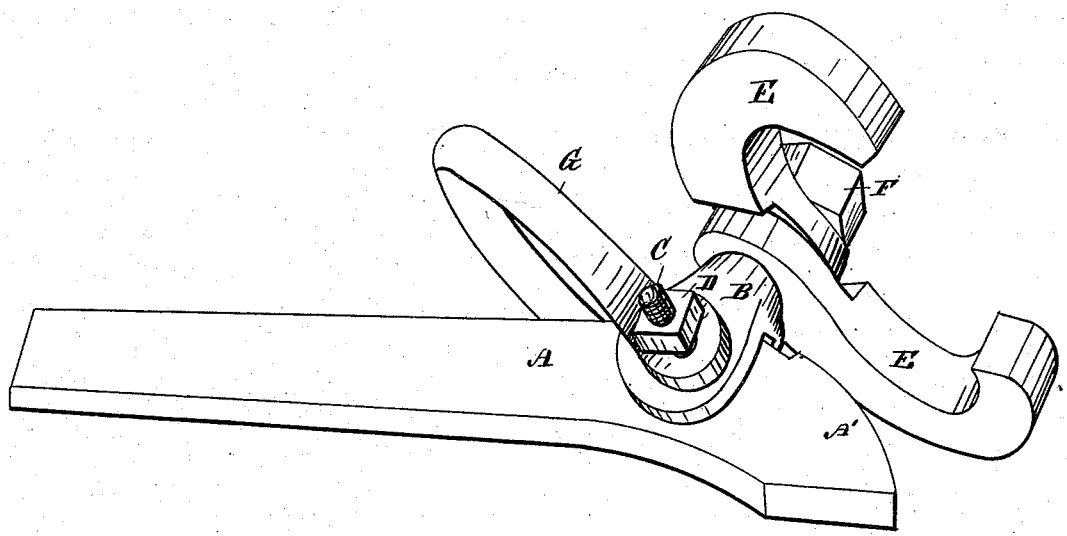
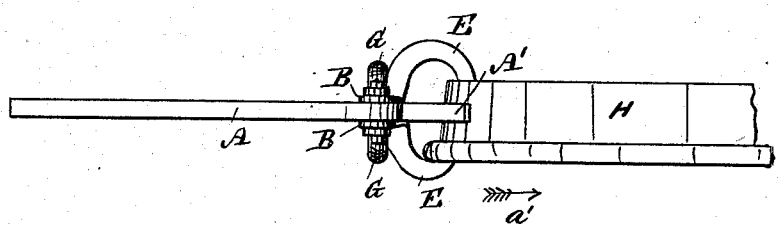
WITNESSES:
Theo. G. Hoster
C. Sedgwick
INVENTOR:
J. D. Lawrence
BY Munn & Co
ATTORNEYS.

UNITED STATES PATENT OFFICE.

JAMES D. LAWRENCE, OF CARROLL, IOWA, ASSIGNOR OF ONE-HALF TO JAMES E. GRIFFITH, OF SAME PLACE.

CAR-MOVER.

SPECIFICATION forming part of Letters Patent No. 255,639, dated March 28, 1882.

Application filed January 19, 1882. (No model.)

*To all whom it may concern:*

Be it known that I, JAMES D. LAWRENCE, of Carroll, in the county of Carroll and State of Iowa, have invented new and Improved Car-Movers, of which the following is a full, clear, and exact description.

The object of my invention is to provide a new and improved device for moving cars short distances in switching, shunting, and coupling these cars.

The invention consists in combining a lever with a pivoted pintle, pivoted jaws, and a loosely-mounted clevis, as hereinafter described.

Reference is to be had to the accompanying drawings, forming part of this specification, in which similar letters of reference indicate corresponding parts in both the figures.

Figure 1 is a perspective view of the lower end of my improved car-pusher. Fig. 2 is a plan view of the same, showing the manner in which it is applied.

The lower edge of a lever, A, is beveled or rounded at the lower end, A', of this lever, and a short distance from this lower end of the lever a forked pintle, B, is pivoted to the lever by means of a bolt, C, provided with a nut, D. On this pintle B two opposite jaws, E E, are pivoted, which jaws are held on the pintle by a nut, F, at the lower end of the same. On the bolt C a clevis or U-shaped loop, G, is mounted in such a manner that it can hang down from the lower edge of the lever A.

The instrument is used as follows: The ends of the jaws E are placed against opposite sides of the wheel H, and the rounded or beveled lower end, A', of the lever A is rested on the tread of the wheel. If the upper or outer end of the lever A is raised, its lower end, A', will be pressed firmly against the tread of the wheel, and the ends of the jaws E E will be pressed against the sides of the wheel and will firmly grasp the wheel. By continued raising of the outer end of the lever A the wheel will be turned and move in the direction of the arrow $a'$. After the outer end of the lever has been raised as high as possible the lower end of the lever is moved downward along the tread of the wheel in the reverse of the direction of the rotation of the wheel, a fresh gripe is taken, the outer end of the lever is again raised, and so on. The clevis hangs down vertically and rests against the outer edges of the inner ends of the jaws, and by its weight presses the jaws together sufficiently to enable them to take a fresh gripe automatically without requiring their adjustment by hand.

Having thus described my invention, what I claim as new, and desire to secure by Letters Patent, is—

The combination, with the lever A, of the pintle B, pivoted thereon, the jaws E, pivoted on this pintle, and the clevis G, loosely mounted on the bolt of the pintle B, substantially as herein shown and described, and for the purpose of automatically closing the jaws, as set forth.

JAMES D. LAWRENCE.

Witnesses:
GEO. W. PAINE,
T. G. PAINE.